Nov. 29, 1966 N. A. SCHUSTER 3,289,072
ANALYSIS OF SUBSTANCES BY MEASUREMENT OF NUCLEAR
MAGNETIC RELAXATION TIMES
Filed Jan. 13, 1953 4 Sheets-Sheet 1

INVENTOR.
NICK A. SCHUSTER
BY
HIS ATTORNEYS.

INVENTOR
NICK A. SCHUSTER
BY
HIS ATTORNEYS.

3,289,072
ANALYSIS OF SUBSTANCES BY MEASUREMENT OF NUCLEAR MAGNETIC RELAXATION TIMES
Nick A. Schuster, assignor, by mesne assignments, to Schlumberger Well Surveying Corporation, Houston, Tex., a corporation of Texas
Filed Jan. 13, 1953, Ser. No. 330,978
13 Claims. (Cl. 324—.5)

This invention relates to techniques and devices for analyzing substances and more particularly to novel methods and apparatus for distinguishing various substances from one another on the basis of their molecular structures as deduced from their nuclear properties.

Recent investigations in nuclear physics have established that the nuclei of certain atoms exhibit paramagnetic properties such that when they are exposed to a strong magnetic field, they will begin to precess in essentially the same manner as a conventional gyroscope when a couple is applied thereto around an axis which makes an angle with the axis of spin. This precession is due to the apparent spin and magnetic moment of the nuclei in question under the influence of the applied magnetic field. The frequency of precession, which is called the "resonant" or Larmor frequency, is found to be, within limits, directly proportional to the magnetic field intensity acting on the nucleus; therefore, by measuring the resonant frequency produced with a known magnetic field, the constant of proportionality can be determined. This constant will be different for different nuclei and its determination will thus enable the atoms of various substances having magnetic moments to be identified.

While the above system will serve to distinguish between certain different elements, it will not readily distinguish different compounds having these same elements in common. Thus, for example, suppose that the nuclei of the atoms composing an element A have the paramagnetic properties necessary for their identification by the above method. Further, suppose that the atoms of two different elements B and C do not have such properties. It would then be exceedingly difficult by this method to distinguish between the two compounds AB and AC since only the element A can be detected.

It is an object of the invention, accordingly, to provide novel methods and apparatus for the identification of substances, which utilize nuclear magnetic resonance phenomena to distinguish between different compounds containing in common elements the atom portions of which have the above-noted property of precessing when exposed to a magnetic field.

A further object is to provide novel methods and means of the above character which are especially adapted for analyzing substances in relatively inaccessible places such as earth formations traversed by a bore hole, for example.

Another object of the invention is to provide novel methods and means for investigating substances in a bore hole drilled in the earth by obtaining indications of the relaxation times for substances containing nuclei embodying magnetic properties and comprising material along the bore hole.

A particular object of the invention is to provide novel methods and apparatus of the above character that are capable of distinguishing oil from water reservoirs in earth strata.

The invention is based in part on a property known as the "relaxation time" which occurs for the reaction of paramagnetic nuclei of an element, precessing at the resonant or Larmor frequency, to the influence of a substantially constant magnetic field. The nature of this property may perhaps be explained best by reviewing briefly the phenomena that are currently assumed to take place when paramagnetic nuclei of an element are exposed to a magnetic field of constant intensity.

Consider a substance containing an element whose nuclei exhibit paramagnetic properties. Such a substance might be water or a hydrocarbon, for example, in which case the nuclei of the hydrogen atoms in the molecules of the substance will have these properties.

Under the influence of a strong constant magnetic field $H_0$, the various hydrogen nuclei (protons) will precess due to the interaction of the magnetic moments associated with the nuclei and the magnetic field $H_0$. This interaction establishes two energy levels, viz., one corresponding to proton magnetic moments having components in line with and in the same direction as the field $H_0$ and another corresponding to proton magnetic moments having components in line with but opposed to the field $H_0$.

The relative numbers or populations of the nuclei in these two energy levels will tend to approach a thermal equilibrium which may be defined as:

$$\frac{Nu}{Nl}=e-\frac{\Delta E}{kT} \qquad (1)$$

where $Nu$=number of protons in the upper energy level in which the magnetic moments have a component opposed to the applied magnetic field,
$Nl$=number of protons in the lower energy level in which the moments have a component in the same direction as the applied magnetic field,
$\Delta E$=the energy difference of the two levels,
$k$=Boltzmann's constant,
$T$=the absolute temperature, and
$e$=the natural logarithmic base.

The time constant with which the two levels approach this thermal equilibrium value is then defined as the relaxation time. It is, therefore, a measure of how rapidly the proton system can give thermal energy to or receive thermal energy from its neighboring atoms and depends upon the properties, distances, and relative motions of the various other atoms in the vicinity of the precessing nuclei. These properties and distances in turn depend on the molecular structure of the substance under investigation. Thus, different compounds containing like elements will exhibit different "relaxation times" and may accordingly be distinguished.

If now, the substance is also subjected to an alternating magnetic field $H_1$, substantially perpendicular to the static field $H_0$ and having substantially the precession frequency, the alternating field will cause lower energy level protons to make transitions to the upper level and upper level protons to make transitions to the lower level. Since there are more protons to begin with in the lower level (if thermal equilibrium has been established) energy will be absorbed from the source of the field $H_1$ in this process. A convenient method of observing this resonant absorption of energy is to modulate either the frequency of the alternating field $H_1$ or the magnitude of static field $H_0$ so as to sweep through the resonance point at a suitable modulation frequency $fa$. If the source of the alternating field $H_1$ is a coil energized by electrical energy at the precession frequency, the resultant modulation of the energy absorbed by the nuclear resonance phenomenon will in turn produce a corresponding modulation of the amplitude of the voltage $V_1$ across the coil. The properties of the resonance phenomenon are such that the amplitude of the modulation envelope $Va$ will be a maximum when $$H_1 \text{ av.} = \frac{1}{\gamma(T_1 T_2)^{1/2}} \quad (2)$$

where $T_1$ is the relaxation time,
$T_2$ is the reciprocal of the resonance bandwidth,
$H_1$ av. is the average A.C. amplitude of the alternating field,
$\gamma$ is a constant.

If the constant magnetic field $H_0$ is quite homogeneous, the bandwidth of the resonance phenomenon in both oil and water is very narrow, being on the order of 0.01 gauss or less. However, if the field $H_0$ is maintained sufficiently inhomogeneous to broaden the bandwidth to a value, say, greater than 0.1 gauss, $T_2$ will be the same for both oil and water. If, under these conditions, the voltage $V_1$ across the coil generating the alternating field $H_1$, which is proportional to the field $H_1$, is adjusted to the value required to produce a maximum value for the modulation envelope $Va$, the following relation will hold:

$$V_1 \gamma \frac{1}{\sqrt{T_1}} \quad (3)$$

Therefore, the voltage $V_1$ across the coil generating the alternating field will depend upon the relaxation times of the proton resonance phenomenon in oil and water.

According to the present invention, different substances containing a common element having paramagnetic nuclei are distinguished by measuring their respective relaxation times. Broadly, this is accomplished by exposing the substance simultaneously to a strong, substantially homogeneous magnetic field of constant intensity and to a magnetic field alternating at the nuclear precession (Larmor) frequency and obtaining indications of the energy absorbed from the high frequency field as a result of the above-described nuclear resonance phenomenon.

More specifically, a coil energized electrically at the nuclear precession frequency is used to generate the alternating field and the voltage across the coil is maintained substantially at the value required to produce a maximum value for the modulation envelope $V_a$ from nuclear resonance in the substance being tested at the particular constant magnetic field strength being used. Either the frequency of the alternating field or the strength of the constant field is modulated over a portion of the resonance line-width, thereby producing a corresponding modulation in the voltage across the coil. The voltage across the coil for which the amplitude of the modulation envelope is a maximum is taken as a measure of the relaxation time for the substance under test. By comparing the voltage obtained for an unknown substance with voltages previously determined for known substances having the resonant element in common at a corresponding applied resonant frequency and magnetic field strength, the identity or lack of identity of the unknown with one of the known substances can readily be determined.

The invention also contemplates the provision of novel control means for maintaining the frequency of the oscillating magnetic field substantially at the resonant or precession frequency of the nuclei of interest in the substance being tested, as well as means for causing the voltage across the coil generating the oscillating field to assume at some instant of time the optimum value for nuclear magnetic resonance absorption.

For analyzing substances in inaccessible locations as, for example, earth formations traversed by a bore hole drilled into the earth, the apparatus is adapted to be lowered into the bore hole, as will be described in greater detail hereinafter.

The invention will be better understood from the following detailed description of several representative embodiments, taken in conjunction with the accompanying drawings in which.

Figure 1:
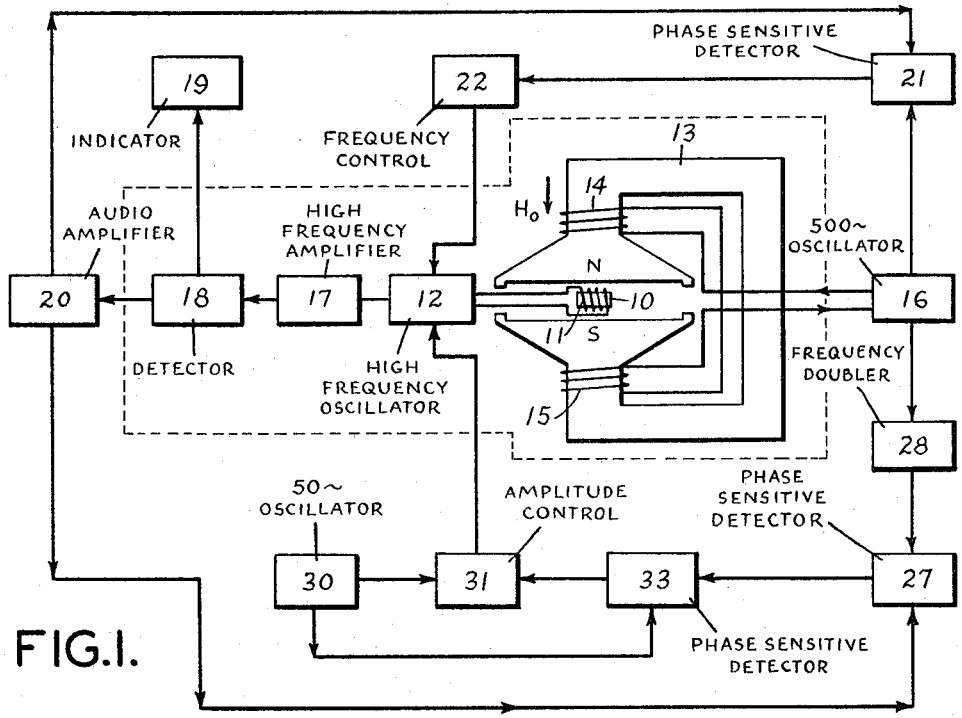
FIG. 1 is a schematic diagram of apparatus constructed according to the invention for determining the relaxation times of different substances.

Referring now to FIG. 1, analyzing apparatus according to the invention may comprise, for example, a nonmagnetic capsule 10 for containing the substance or compound to be analyzed, disposed in the air gap between the adjacent north and south poles N and S, respectively, of suitable magnetic field generating means 13 which may be a permanent magnet, for example. The magnet 13 provides a strong, uniform magnetic field $H_0$ in its air gap, as required to cause paramagnetic nuclei of atoms in the test substance in the capsule 10 to precess at the resonant frequency as described above. A winding 11, adapted to be energized by a suitable high frequency oscillator 12 establishes an oscillating field of the precessional frequency in the capsule 10 approximately at right angles to the field in the air gap between the poles N and S of the magnet 13.

The amplitude of the constant field $H_0$ may be modulated by a small amount and at a relatively low frequency by means of coils 14 and 15 wrapped around the pole pieces of the magnet 13 and energized by an audio oscillator 16 adapted to generate a 500 cycle per second signal, for example. This causes the precessional frequency of the paramagnetic nuclei to swing back and forth through the resonance frequency corresponding to the steady field $H_0$, thereby modulating both the loading on the oscillator 12 and the voltage across the coil 11. The latter voltage may be passed through a suitable high frequency amplifier 17, detected in a conventional high frequency detector 18, and observed or recorded by an indicator 19. The indicator 19 should preferably have a large enough time constant such that it responds only to the average voltage in the output of the detector 18 and is essentially nonresponsive to the 500 cycle per second modulation envelope.

In view of the theoretical discussion presented earlier herein it will be apparent that, in order to obtain indications of the relaxation time, the frequency and magnitude of the voltage supplied to the coil 11 by the oscillator 12 must be maintatined constantly at values $F_0$ and $V_0$ corresponding, respectively, to the precession frequency of the paramagnetic nuclei in the substance being tested, and to the optimum voltage value specified above.

The maintenance of a substantially constant frequency corresponding to the strength of the magnetic field $H_0$ is effected, according to the invention, by detecting any deviation from the correct frequency of the voltage supplied to the coil 11 and actuating frequency control means 22 such as a reactance tube, for example, to restore the frequency of the oscillator 12 to its original value. Preferably, changes in the frequency of the oscillator 12 are detected by observing the characteristic changes in the phase of the modulation envelope of the oscillator output signal that take place when the frequency rises above or falls below a reference value, as described below with reference to FIG. 2.

Figure 2:
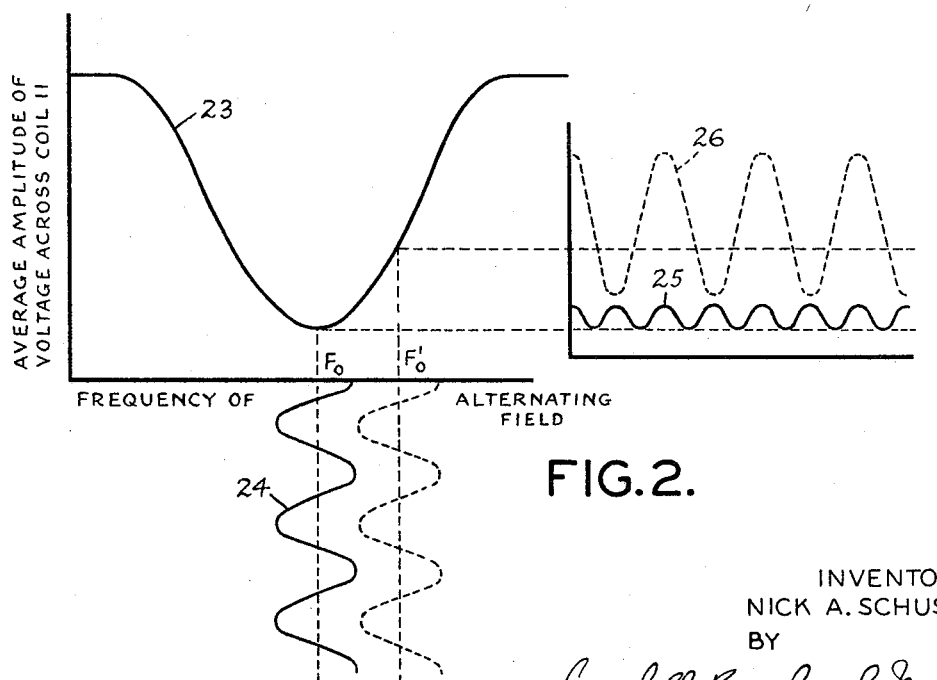
FIG. 2 is a graph illustrating the nuclear magnetic resonant absorption curve for a typical substance and containing plots of related curves corresponding to several of the electrical phenomena occurring in the apparatus of FIG. 1 during analysis of an unknown substance.

The curve 23 in FIG. 2 is a typical nuclear magnetic resonance absorption curve for a substance or compound in the capsule 10 of FIG. 1. The ordinate axis represents a parameter proportional to the average amplitude of the high frequency voltage supplied to the coil 11 by the oscillator 12 while the abscissa scale represents frequency increasing to the right. For the constant magnetic field $H_0$ provided by the magnet 13, the resonant or precession frequency $F_0$ is at the minimum point of the resonance curve 23 where maximum absorption obtains.

The curve 24 in FIG. 2 represents the variation in the precessional frequency of the paramagnetic nuclei resulting from the 500 cycle per second modulation of the field $H_0$ by the coils 14 and 15 and the oscillator 16 (FIG. 1) as described above. The curve 24 has an alternating wave form at the frequency of 500 cycles per second. If the frequency of the signal generated by the oscillator 12 is exactly $F_0$, then the 500 cycle per second modulation impressed on the field $H_0$ will cause the loading of the oscillator 12 and the voltage across the coil 11 to vary in the manner represented by the curve 25 in FIG. 2. This curve, which may be constructed by projecting points on the curve 24 to the curve 23 and plotting as a function of time the differences between the ordinate corresponding to the minimum point on the curve 23 and the respective ordinates corresponding to the points on the curve 23 projected from the curve 24, has twice the frequency of the wave 24 when the frequency of the oscillator 12 is $F_0$.

Assume now that the frequency of the oscillator 12 drifts to a new value $F_0'$ (FIG. 2) slightly higher than $F_0$. Under these conditions, the loading of the oscillator 12 and the voltage across the coil 12 may vary in the manner represented by the curve 26 in FIG. 2. This curve, which may be constructed in the same way as the curve 25, is seen to have the same frequency as the curve 24.

On the other hand, if the frequency drift of the oscillator 12 is in the reverse direction to a value below $F_0$, the curve representing the loading of the oscillator 12 and the voltage across the coil 11 will be 180° out of phase with the curve 26.

To summarize, so long as the frequency of the signal generated by the oscillator 12 is exactly $F_0$, the modulation envelope frequency of the voltage across the coil 11 will be twice the frequency at which the field $H_0$ is modulated, i.e., 1,000 cycles per second. If the oscillator frequency rises above, or drops below the resonance value $F_0$, the modulation envelope will have a component of the same frequency as the modulation of the field $H_0$, which component will have one phase for a rise in frequency and the opposite phase for a drop in frequency. These unique properties are utilized, according to the invention, to maintain the frequency of the oscillator 12 constant at the desired value $F_0$ corresponding to the frequency of precession of paramagnetic nuclei of atoms in the substance being tested.

Thus, the modulation envelope of the voltage across the coil 11, after detection in the detector 18, is amplified in a suitable audio amplifier 20 and fed to phase sensitive detector means 21 which may also receive a 500 cycle per second signal from the oscillator 16 to render it sensitive to signals of that frequency and given phase. The phase sensitive detector means is designed to be non-responsive to signals of double the field modulation frequency (1,000 c.p.s.) which obtain when the frequency of the oscillator 12 is correct, and to provide output signals of opposite polarity in response to the respective signals of opposite phase which correspond to a rise or a drop, respectively, in the frequency of the oscillator 12. A phase sensitive detector suitable for this purpose is described in detail in pages 111–114 of the textbook "Theory of Servo-Mechanisms" by James, Nichols, Phillips (vol. 25, Radiation Laboratory series, first edition, 1947, published by McGraw-Hill Book Company, New York). Where the signal-to-noise ratio is likely to be small the improved phase sensitive detector described in pages 254–255 of "Review of Scientific Instruments" by N. A. Schuster, vol. 22, April 1951, may advantageously be employed.

The feedback frequency control system described above operates extremely rapidly and will serve to maintain the frequency of the oscillator 12 substantially at the precession or resonance frequency $F_0$ of the paramagnetic nuclei of the atoms in the subtsance being subjected to analysis. Accordingly, the modulation envelope of the voltage across the coil 11 will continuously have a quency (1,000 c.p.s.) which obtain when the frequency at which the field $H_0$ is modulated.

Of course, the correct ratio of $F_0$ to $H_0$ for resonance may be maintained by controlling the value of the static magnetic field $H_0$, instead of the frequency, if desired.

The voltage $V_1$ supplied to coil 11 from oscillator 12 may be maintained at the required optimum value by a special automatic control circuit. For proper operation of this circuit, it is desirable to have available a signal the magnitude of which varies in accordance with the amplitude of the 1,000 cycle per second modulation envelope of the voltage across the coil 11. For production of such signal, the amplified 1,000 cycle per second modulation envelope from the amplifier 20 may be supplied to a phase sensitive detector 27 which may derive its phase sensitizing reference voltage from a frequency doubler 28 connected to receive a 500 cycle per second signal from the oscillator 16. The frequency doubler 28 doubles the 500 cycle per second output of oscillator 16 so that the reference voltage is of the same frequency (1,000 cycles per second) as the modulation envelope. The phase sensitive detector 27 may be of the same type as the phase sensitive detector 21 and it is adapted to provide an output signal the magnitude of which is proportional to the amplitude of the audio modulation envelope of the voltage across the coil 11.

Alternatively, the 1,000 cycle per second modulation envelope may be passed through a simple low frequency detector to provide a signal proportional to the amplitude of the modulation envelope. In this case, no reference voltage would be required and the detector would simply replace the circuit represented by the phase sensitive detector 27 in FIG. 1. The frequency doubler 28 and the associated lead wires could then be removed. Preferably, a filter designed to pass frequencies in the neighborhood of 1,000 cycles per second should precede the detector to eliminate any 60 cycle per second power pick-up that may occur.

Figure 3:
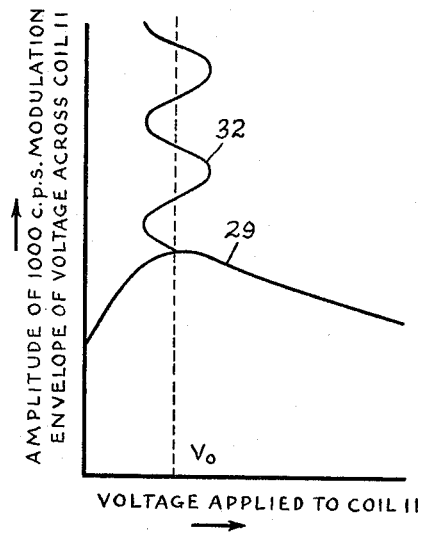
FIG. 3 is a graph representing the relation between the voltage across the coil 11 of FIG. 1 and the amplitude of its modulation envelope for a given substance experiencing nuclear resonance absorption.

In FIG. 3 is shown a curve 29 illustrating the relation between the amplitude of the 1,000 cycle per second modulation envelope of the voltage across the coil 11 (the output of the phase sensitive detector 27), and the voltage applied to the coil 11 by the oscillator 12. It will be noted that the curve 29 has a peak at an optimum voltage value $V_0$. This characteristic curve 29 may be utilized to maintain the voltage impressed upon the coil 11 by the oscillator 12 constant at the optimum value $V_0$ in much the same manner that the curve 23 in FIG. 2 is used to maintain the oscillator frequency constant.

This may be accomplished by feeding a signal having a frequency of say 50 cycles per second from a suitable oscillator 30 to an amplitude control device 31 designed to vary the voltage output from the oscillator 12 to the coil 11 about the optimum voltage value $V_0$ at a frequency of 50 cycles per second. This action is represented by the wave form 32 in FIG. 3.

So long as voltage of optimum magnitude $V_0$ is supplied to the coil 11 by the oscillator 12, the 50 c.p.s. modulation of the amplitude thereof will modulate the amplitude of the 1,000 c.p.s. modulation envelope of the voltage across the coil 11 at twice the 50 c.p.s. frequency or 100 c.p.s. If the magnitude of the voltage supplied rises above or drops below the optimum value $V_0$, the 50 c.p.s. amplitude modulation thereof will impress a 50 c.p.s. modulation on the amplitude of the 1,000 c.p.s. modulation of the voltage across the coil, which will be of one phase for a rise in voltage and of the opposite phase for a drop in voltage. Thus, the phase sensitive detector 27 (FIG. 1) will provide a 100 c.p.s. signal output while the optimum voltage value $V_0$ is being supplied by the oscillator 12, and 50 c.p.s. signals of opposite phase for higher and lower voltage values, respectively.

The output of the phase sensitive detector 27 is fed to another phase sensitive detector 33 which receives a phase sensitizing signal from the oscillator 30. The detector 33 may be of the same type as the detector 21 and it provides zero output when voltage of optimum value is being supplied by the oscillator 12 as indicated by a 100 c.p.s. output from the detector 27 and outputs of opposite polarity for 50 c.p.s. inputs of opposite phase, respectively, representing votlage values above and below the optimum value, respectively.

From the above description, it will be clear that the apparatus shown in FIG. 1 will maintain the frequency of the applied field at the resonance or precession frequency of the precessing nuclei in the substance under investigation, and the voltage applied to the coil 11 at the optimum value required to satisfy Equation 2. Thus, from Equation 3, indications of the relaxation time may be obtained by observing the voltage V registered by the indicator 19.

Figure 4:
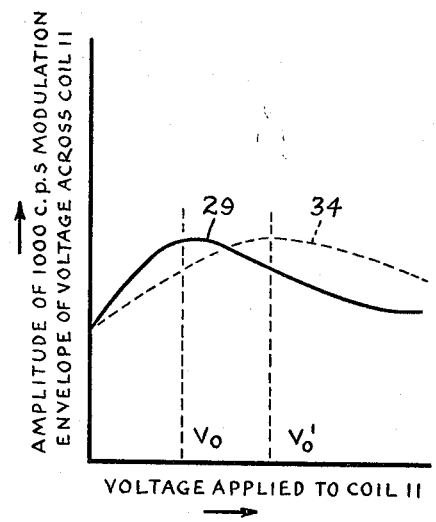
FIG. 4 is a graph illustrating the same relation as in the graph of FIG. 3 for water and oil under laboratory conditions.

In a typical laboratory test, a sample of a hydrogen-containing substance such as water, for example, is placed in the capsule 10 and the reading of the indicator 19 is observed. Suppose now that a different hydrogen-containing substance or compound such as oil, for example, is placed in the capsule 10. Because of the different molecular structure in the two substances, the relaxation times $T_1$ will be different and the values of the optimum voltages that must be applied to the coil 11 to satisfy Equation 2 will be different. This situation is illustrated in FIG. 4 wherein the peak amplitude of the curve 34 for oil occurs at voltage value $V_0'$ which is greater than the voltage value $V_0$ at which the peak amplitude of the curve 29 for water occurs. In both cases, the action of the circiut in FIG. 1 is such as to maintain the voltage supplied to the coil 11 by the osciallator 12 at the correct value $V_0$ or $V_0'$. The changed voltage reading on the indicator 19 obtained for the oil sample will thus inform the operator that the substance being investigated is different from the water sample previously tested. Where the relaxation time in water is one hundred times as long as in oil, the voltage reading for oil would be ten times as great as the voltage reading for water, as predicted by Equation 3 above.

It might be well to note here that the audio output signal from the detector 33 (and the amplitudes of the curves 29 and 34 in FIG. 4) will depend on the number of nuclei contributing to the absorption of energy i.e., on the amount of substance constituting the sample. Thus, the curves 29 and 34 in FIG. 4 are for samples of like quantities of water and oil, respectively. The reading given by the indicator 19, however, is not influenced by the amount of substance in the sample, but only by its molecular structure. The output from the detector 33 could also be recorded on a separate indicator (not shown).

Figure 5:
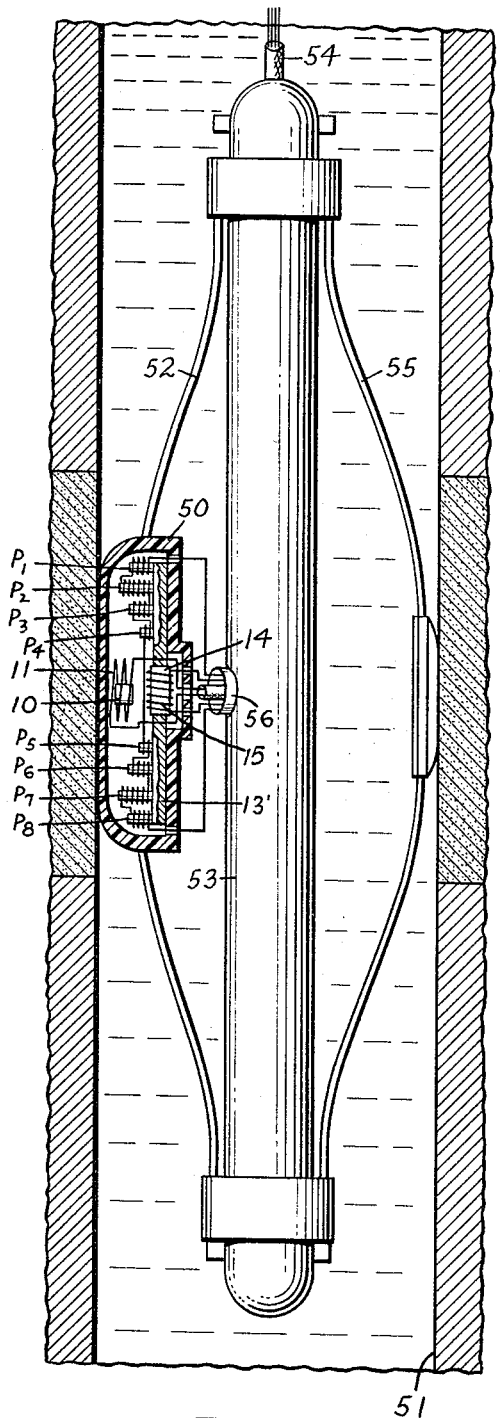
FIG. 5 illustrates schematically apparatus constructed according to the invention for analyzing substances in inaccessible places such as earth formations traversed by a bore hole drilled into the earth, for example.

In FIG. 5 is shown apparatus for analyzing substances located in relatively inaccessible places such as earth formations traversed by an oil well, for example. In this embodiment, the apparatus is to be used for distinguishing between oil and water or for indicating the relative amounts of oil and water in the earth formations traversed by the bore hole.

To this end, the capsule 10, the coil 11, a static magnetic field generating magnet 13', and the modulating field coils 14 and 15 are mounted within an insulated cushion member 50 made of a flexible, nonhydrogenous material such as Teflon, for example. Preferably, a very small amount of proton containing material such as water, for example, is placed in the capsule 10 to maintain the system in oscillation when no resonant proton bearing formation is in the vicinity of the coil 11. In order to prevent any bore hole mud from interfering with the measurements, means are provided for urging the cushion member 50 against the side wall of the bore hole 51 (FIG. 5). Thus, the cushion member 50 may be mounted on a bowed spring 52 slidably secured at its upper and lower ends to an elongated central body 53 arranged to be raised and lowered in the bore hole by a cable 54 in the conventional manner. An additional bowed spring arm 55 may be disposed opposite the spring 52 and urged against the opposite wall of the bore hole in order to maintain body 53 centered therein. Other suitable means for urging the cushion member 50 against the side wall may, of course, be employed.

Preferably, the diameter of the coil 11 should be relatively large so that its magnetic field will extend an appreciable distance into the formations beyond the side wall of the bore hole 51. The magnet 13' may comprise an electromagnet having a plurality of poles $P_1$, $P_2$, $P_3$, $P_4$, $P_5$, $P_6$, $P_7$ and $P_8$. These poles are provided with energizing windings, as shown, which may be connected in series to a suitable D.C. source (not shown). The strength and polarity of the poles are designed such that the magnetic field distribution at the capsule 10 will be of about the same flux density and homogeneity as exists in the region of the formation penetrated by the alternating magnetic field from the coil 11.

The entire system shown in FIG. 1 may be disposed in the body 53 and connected to the elements in cushion 50 by appropriate insulated conductors in a cable 56. It is more desirable, however, to locate as many of the system components as possible at the surface and to connect them to the elements in the cushion member 50 by means of electrical conductors in the supporting cable 54. For example, in FIG. 1, all of the system components with the exception of the oscillator 12, the amplifier 17, and the detector 18, which are enclosed in dotted lines, may conveniently be kept at the surface.

Practical considerations indicate that, under the conditions usually prevailing in an oil well, effects attributable to paramagnetic molecules will tend to reduce the difference in the relaxation times for water and oil, respectively, as determined from laboratory measurements. This is particularly true in wells containing drilling mud weighted with iron oxides, for example.

Figure 6:
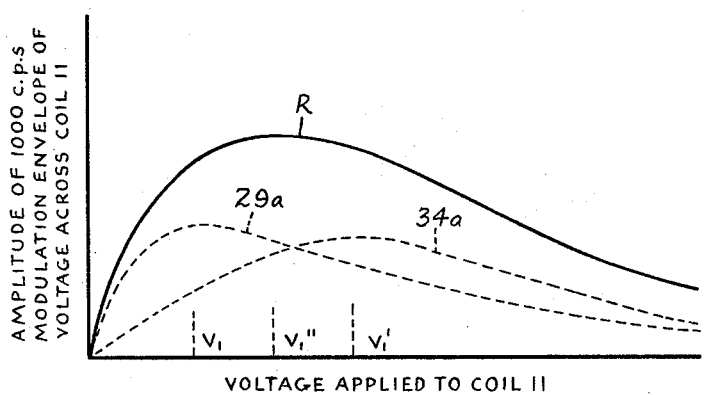
FIG. 6 is a graph illustrating qualitatively the same relation as in FIG. 3 for oil and water in earth formations traversed by a well.

Typical curves of the relation between the 1,000 cycle modulation envelope of the voltage across the coil 11, and the voltage applied to the coil 11 by the oscillator 12 for these conditions are again shown in FIG. 6.

Since the permeable zones immediately adjacent the wall of the bore hole are always flushed by the drilling liquid, the peak amplitude of the water curve 29a will usually be greater than the peak amplitude of the oil curve 34a. Further, the characteristics of the two curves 29a and 34a are such that their sum is a single peaked curve R having a peak amplitude at a voltage value $V_1''$ intermediate $V_1$ and $V_1'$.

In operation, the apparatus of FIG. 5 is first energized and adjusted as described above and then the body 53 is lowered into a well. Initially, the indicator 19 (FIG. 1) will provide a voltage reading corresponding to the optimum voltage value $V_1$ (FIG. 6) for water molecules, either from the water sample in the capsule 10 or from the sample and any water in the bore hole or in the surrounding earth formations. As soon as the body 53 arrives at the level of formation containing an intimate mixture of oil and water, the reading of the indicator 19 will increase to the value $V_1''$ (FIG. 6) indicating the presence of oil.

It will be appreciated that in the apparatus shown in FIG. 5, the penetration of the magnetic field into the surrounding formation is limited to a relatively short distance from the wall of the bore hole. Where a greater depth of penetration is desired, i.e., beyond the invaded zone, the modification shown in FIG. 5A may be employed. This apparatus is basically similar to that shown in FIG. 5 and corresponding parts are designated by corresponding reference characters. No water sample containing capsule 10 is shown, although one may be included, if necessary, for the purpose of maintaining the system in oscillation when no proton bearing formation is in the vicinity of the portion of the apparatus in the bore hole.

Figure 5A:
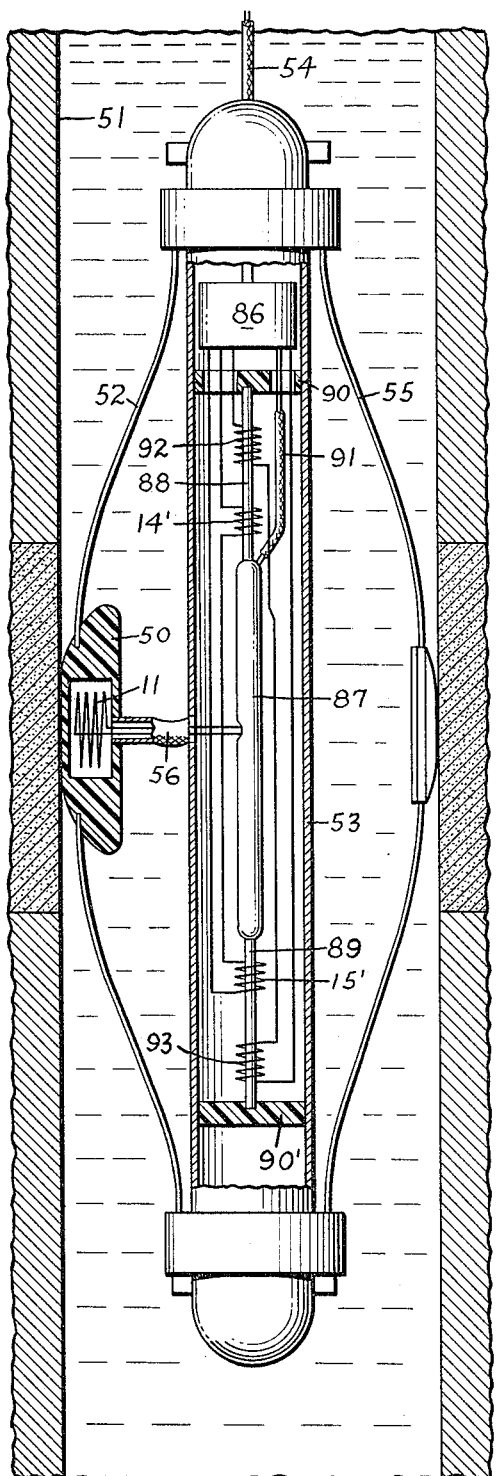
FIG. 5A is a schematic diagram of a modified form of the apparatus shown in FIG. 5.

Instead of using the magnetic pole structure 13 of FIG. 5, in FIG. 5A the magnetic field is developed by magnetic means comprising a hollow casing 87 made of material of low magnetic reluctance such as soft iron, for example, having upper and lower core members 88 and 89, respectively, formed thereon and supported by transverse members 90 and 90', respectively, secured within the body.

Wound on the core members 88 and 89, respectively, are a pair of coils 14' and 15', respectively, which correspond in structure and function to the coils 14 and 15, respectively, of FIG. 1. The core members 88 and 89, respectively, may also carry series connected windings 92 and 93, respectively, which are adapted to be energized by constant but adjustable amplitude D.C. from any suitable source (not shown) to establish a D.C. field of desired strength in the formation at the level of the pad 50. The core members 88 and 89 are magnetically permeable and the magnetic circuit is so constructed that strong magnetic fields are developed at the upper extremity of the core member 88 and at the lower extremity of the core member 89.

With this construction, the distribution of the magnetic field beyond the wall of the bore hole is lower in magnetic intensity and correspondingly more uniform than in the case of the embodiment shown in FIG. 5. In both forms of the invention, however, homogeneity of the magnetic field is maintained within a few percent over the volume where the sample of formation material is to be investigated.

The hollow casing 87 may contain some of the electronic equipment such as the oscillator 12, the amplifier 17, the detector 18, and perhaps the frequency control apparatus 22 of FIG. 1, although the amount of electronic equipment in the casing 87 should be kept to a minimum. The remainder of the equipment and perhaps some of the items mentioned above may be disposed in a suitable container 86 mounted in the upper portion of the shell 53. The several portions of the apparatus disposed in the container 86 and in the casing 87 may be connected by a cable 91 containing a sufficient number of electrical conductors for this purpose.

The embodiment shown in FIG. 5A operates in essentially the same manner as that shown in FIG. 5. The principal difference resides in the larger spatial distribution of the magnetic field in the former.

Figure 7:
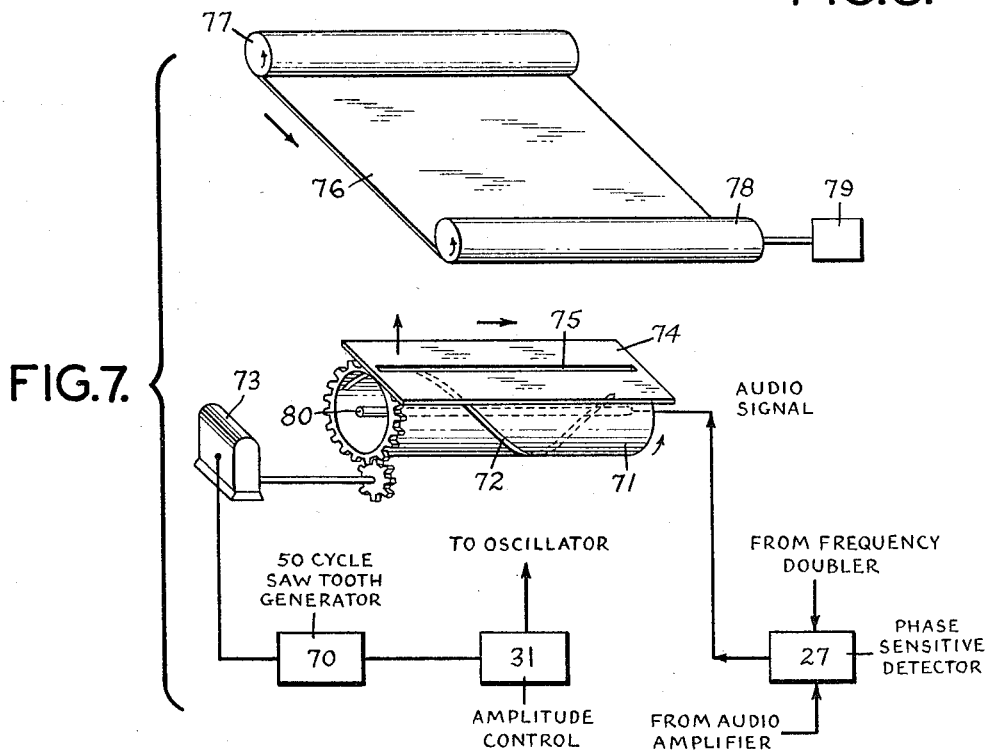
FIG. 7 is a schematic diagram of means for recording the response of a system such as that shown in FIG. 5 to oil and water, as a function of the depth of the exploring apparatus in the bore hole.

FIG. 7 illustrates schematically a modified form of recording apparatus which may be employed in place of the indicating means shown in FIG. 1. This embodiment differs from the apparatus shown in FIG. 1 in that the phase sensitive detector 33 is eliminated and the audio signal from the detector 27 is fed directly into the modified recording apparatus to be described presently. The amplitude control 31 is the same as in FIG. 1 except that it is no longer fed by the output of the phase sensitive detector 33. The fifty cycle per second oscillator 30 of FIG. 1 is replaced by a fifty cycle per second saw tooth generator 70 (FIG. 7).

The recording apparatus illustrated in FIG. 7 is designed to indicate the relative amounts of water and oil in the bore hole contributing to the absorption of energy from the alternating field. Essentially, it comprises a facsimile type system which reproduces continuously the graph of FIG. 6, and changes occurring therein, as the apparatus of FIGS. 5 or 5A is moved along the bore hole axis. This is accomplished by periodically increasing the voltage applied to the coil 11 by the oscillator 12 linearly with time from a minimum to a maximum value by means of the saw tooth generator 70 feeding the amplitude control device 31, thus sweeping the value of the voltage supplied to the coil 11 through the values $V_1$ and $V_1'$ fifty times each second.

The recording apparatus (FIG. 7) includes a hollow cylinder 71 having formed therein a helical slot 72 of pitch equal to the cylinder length. The cylinder 71 is coupled to a motor 73 synchronized with the saw tooth generator, which causes the cylinder 71 to rotate at the same frequency as the saw tooth wave; in this case, fifty times a second. A flat plate 74 having an elongated slot 75 parallel to the cylinder 71 is disposed adjacent the top of the cylinder in such a manner that the cylinder 71 rotates under the plate as shown. Disposed parallel to the surface of the plate 74 is the flat surface of a strip of photographic film 76 arranged to be moved past the slot 75 by unwinding from a drum 77 and winding onto a drum 78 driven by motor 79, for example. Coaxially positioned in the cylinder 71 is an elongated light source 80 energized in response to the audio signal from the phase sensitive detector 27 and adapted to provide a light intensity proportional to the voltage applied thereto.

In operation, as the cylinder 71 rotates, the point of registration of the slots 72 and 75 will define an aperture that moves along the top of the cylinder. Light passing through the moving aperture will sweep across the face of the film strip 76 from left to right fifty times each second, exposing a succession of parallel traces thereon. In synchronism with the moving light beam, the voltage V fed to the coil 11 (FIG. 5) is increased linearly from a minimum to a maximum value by the saw tooth generator 70 acting on the amplitude control device 31. The audio signal from detector 27 will, therefore, vary the intensity of the light source 80 in accordance with the ordinates of the graph shown in FIG. 6. Preferably, the film strip 76 is moved past the slot 75 in timed relation to the movement of the apparatus of FIGS. 5 or 5A along the bore hole, so that the longitudinal scale for the resultant log will represent depths in the bore hole.

Figure 8:
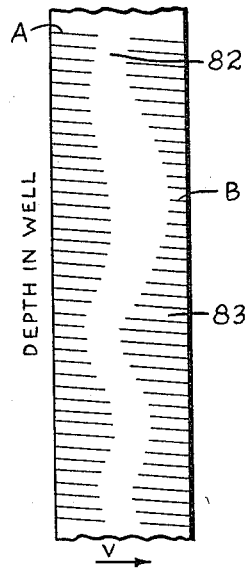
FIG. 8 illustrates a typical record made by the apparatus shown in FIG. 7.

The final log obtained on developing and printing the film strip 76 will be substantially as shown schematically in FIG. 8. The longitudinal scale for the log will represent depths in the bore hole, while the transverse scale will represent the voltage applied to the coil 11 by the oscillator 12, the left and right edges of the log corresponding to the minimum and maximum voltage values, respectively, between which this voltage is swept by the saw tooth generator 70. The log appears in the form of a longitudinal succession of parallel traces 82 each of which is equivalent to a curve of the type shown in FIG. 6 except that the amplitude of each ordinate is indicated by the density of the trace 82 at the corresponding abscissa value, the trace density being a minimum on the print for the maximum ordinate value.

Where only water is present at the level of the apparatus in the well, the trace 82 for the corresponding level A on the graph of FIG. 8 will correspond to the water curve 29a in FIG. 6, and the point of minimum density will be towards the left-hand side of the log, indicating that only water is present. If in going from the level A to the level B on the graph of FIG. 8 oil in increasing amounts is found in admixture with water, the point of minimum density moves towards the right on the log and at the level B may correspond to the resultant curve R in FIG. 6. Further, the lighter portion of the trace 82 at the level B will be wider than the lighter portion of the trace 82 at the level A for water alone, corresponding to the band-widths of the curves R and 29a in FIG. 6.

An important feature of the system described above is that they not only permit oil and water bearing strata to be distinguished but also provide an indication of the relative amounts of each that may be present. Further, it will be evident that the width of the lighter portion of any trace 82 at any given depth will depend on the porosity at this depth. Therefore, the log of FIG. 8 will provide additional data about the earth formations.

It should be noted that in the systems of FIGS. 1, 5, 5A and 7, the use of 50 and 500 cycle per second oscillators for modulating purposes is suggested merely by way of example and it is obviously possible to use different modulating frequencies. Also, instead of providing a capsule 10 containing proton bearing material in the embodiment of FIG. 5, a portion of the bore hole apparatus in proper relation to the coil 11 might be made of suitable proton bearing material. Moreover, other forms of recording apparatus, other than that disclosed in FIG. 7, may be employed. For example, it would be possible to use a cathode ray oscilloscope having its horizontal sweep synchronized with the saw tooth generator and its vertical deflection plates connected to receive the audio signal from the detector 27 of FIG. 7. In this case, the graph of FIG. 6 would appear on the screen of the cathode ray tube and it could, of course, be photographed periodically as the apparatus is raised through the bore hole. Alternatively, the audio signal could be connected to the grid of a cathode ray tube rather than to the vertical plate, so that the horizontal trace on the screen of the tube would become brighter for values of the audio signal corresponding to its various maxima. In this event, the light source 80 and the drum 71 would not be needed, but the visible trace on the screen of the cathode ray tube would be recorded directly on the film 76.

If desired, any suitable means might be associated with the bore hole apparatus of FIGS. 5 and 5A to aid in determining the location of such apparatus in a well. For example, an electrode might be mounted on the pad 50 and indications obtaintd of spontaneous potentials existing between the well and ground for this purpose.

In a typical system of the type shown in FIG. 5, the static field coil system might be designed to develop in the region close to the bore hole a static magnetic field in the range from 100 to 400 gauss. For a system of the type shown in FIG. 5A, the apparatus might be designed to provide a static magnetic field around one-fourth as large in a larger region disposed cylindrically about the bore hole. In either case, the field strength for the 500 cycle modulating magnetic field generated by the coils 14 and 15 should be about the same order as, or slightly greater than the linewidth of the signal to be expected from the proton resonance for oil; the linewidth for water is always smaller than that for oil.

The strength of the RF magnetic field might be in the region of 0.01 to 1 oersted, say, 0.1 oersted. This would require an RF power output from the radio frequency oscillator 12 in the range from about 0.001 to 0.1 of a watt. For proton resonance, the frequency of the RF oscillator 12 in cycles per second is approximately given by the relationship $f = 4.3 \times 10^3 \times H$, where H is the static magnetic field in oersteds.

If desired, the detecting system in the pad of FIGS. 5 and 5A and the circuits associated therewith could be utilized conveniently at the surface of the bore hole to monitor continuously the drilling fluid which is usually circulated during the drilling operation. This could be accomplished, for example, by simply placing the pad in the mud trough of the circulating system, the presence and amount of oil in the drilling fluid being conveniently logged as a function of drilling depth.

While the specific apparatus shown in FIGS. 5 and 5A has been described above as applied to the location and identification of oil and water, obviously, by selecting the proper frequency for the energy applied to the RF coil to correspond to the resonant absorption frequencies of atomic nuclei other than hydrogen nuclei, other compounds containing such other nuclei in common, can be distinguished in the drilling mud and/or in the bore hole by determinations of their different relaxation times.

Other modifications will occur to those skilled in the art. Therefore, the invention is not to be thought of as limited to the precise embodiments disclosed.

I claim:

1. Apparatus for analyzing substances comprising means for establishing a substantially constant magnetic field in a given region, coil means for simultaneously establishing an alternating magnetic field in said region, means for modulating one of said magnetic fields at a given frequency, electrical oscillator means connected to energize said coil means, means responsive to any signal component of said given frequency in the circuit of said coil means for adjusting the frequency of said oscillator means to maintain the same at a reference value, means for modulating at another frequency the amplitude of the electrical energy supplied to said coil means by said oscillator means, means responsive to any signal component in the circuit of said coil means that is a multiple of said given frequency for maintaining the amplitude of the electrical energy supplied by said oscillator means substantially constant, and means responsive to the voltage across said coil means.

2. In apparatus for geophysical exploration in wells drilled into the earth, the combination of means mounted for movement through a well for establishing a substantially constant magnetic field at a given region in a well, means for establishing an alternating magnetic field at said region and disposed at an angle to said constant field, the frequency of said alternating field being substantially equal to the frequency of precession of nuclei embodying magnetic properties and comprising molecules of material in said region, means for automatically maintaining the energy of said alternating field at an optimum value to facilitate the determination of the relaxation time for said nuclei, and means for obtaining indications of energy absorbed by said nuclei from said alternating field.

3. In apparatus for geophysical exploration in wells drilled into the earth, the combination of means mounted for movement through a well for establishing a substantially constant magnetic field in a region in earth formation traversed thereby, coil means mounted in fixed relation to said constant field establishing means for establishing an alternating magnetic field in said region at an angle to said constant field, a source of alternating electrical energy connected to energize said coil means, means for modulating one of said magnetic fields at a given frequency, means responsive to any signal component in the circuit of said coil means having a frequency that is a multiple of said given frequency for automatically adjusting the output of said source to bring the amplitude of said signal component to a maximum value, and means responsive to the voltage across said coil means.

4. In apparatus for geophysical exploration in wells drilled into the earth, the combination of means mounted for movement through a well for establishing a substantially constant magnetic field in a region in earth formation traversed thereby, coil means mounted in fixed relation to said constant field establishing means for establishing an alternating magnetic field in said region at an angle to said constant field, a source of alternating electrical energy connected to energize said coil means, the frequency of said source being substantially equal to the frequency of precession of nuclei having magnetic properties and comprising molecules of material in said region, means for modulating said constant field at a given frequency, means responsive to any signal component of said given frequency in the circuit of said coil means for automatically maintaining the frequency of said source at the precession frequency of said nuclei, means responsive to any signal component in the circuit of said coil means having a frequency that is a multiple of said given frequency for adjusting the output of said source to bring the amplitude of said last-named signal component to a maximum value, and means responsive to the voltage across said coil means.

5. In apparatus for geophysical exploration in wells drilled into the earth, the combination of means mounted for movement through a well for establishing a substantially constant magnetic field in a region in earth formation traversed thereby, coil means mounted in fixed relation to said constant field establishing means for establishing an alternating magnetic field in said region at an angle to said constant field, a source of alternating electrical energy connected to energize said coil means, means for modulating one of said magnetic fields at a given frequency, means for causing the energy output of said source to sweep periodically through a given range, means for causing a radiant energy beam to sweep periodically through a given range in timed relation to the periodic variation in the output of said source, and means for acting upon said beam as a function of any signal component in the circuit of said coil means having a frequency that is a multiple of said given frequency.

6. The combination defined in claim 5 together with recording means responsive to said radiant energy beam.

7. Apparatus for analyzing substances comprising means for establishing a substantially unidirectional magnetic field in a given region adapted to accommodate a substance to be analyzed, means including an electrically energized coil for simultaneously establishing an alternating magnetic field at said region and at an angle to said unidirectional field to effect precession of elementary particles in the substance, means for modulating said unidirectional magnetic field at a given frequency lower than the frequency of said alternating magnetic field, means for deriving from a signal at said coil a modulation component having a selected harmonic relation to said given frequency, means responsive to said modulation component for adjusting an amplitude characteristic on said alternating magnetic fields to maintain the precession continuously at resonance, and means for obtaining indications dependent upon the aforesaid precession.

8. Apparatus for analyzing substances comprising means for establishing a substantially unidirectional magnetic field in a given region adapted to accommodate a substance to be analyzed, means including an electrically energized coil for simultaneously establishing an alternating magnetic field at said region and at an angle to said unidirectional field to effect precession of elementary particles in the substance, means for modulating the amplitude of said unidirectional magnetic field at a given frequency lower than the frequency of said alternating magnetic field, means for deriving from a signal at said coil a modulation component of said given frequency, means responsive to said modulation component to adjust the amplitude of said alternating magnetic fields to maintain the precession continuously at resonance, and means for obtaining indications dependent upon the aforesaid precession.

9. Apparatus for analyzing substances comprising means for establishing a substantially unidirectional magnetic field in a given region adapted to accommodate a substance to be analyzed, means including an electrically energized coil for simultaneously establishing an alternating magnetic field at said region and at an angle to said unidirectional field to effect precession of elementary particles in the substance, means for modulating said unidirectional magnetic field at a given frequency lower than the frequency of said alternating magnetic field to develop a modulation signal across said coil dependent upon the absorption characteristics of the precessing particles, means for detecting said modulation signal, feedback means responsive to the modulation signal for adjusting a characteristic of one of said magnetic fields to minimize the component of said modulation signal at said given frequency, and means responsive to the signal across said coil for providing an indication dependent upon the quantity of the precessing particles.

10. A method for nondestructively analyzing a sample comprising the steps of: equally magnetizing unidirectionally constituent nuclei within both said sample and an additional monitoring sample known to contain nuclei having certain predetermined characteristics; permeating each of the samples with a magnetic field whose orientation is transverse to that of its unidirectional magnetization and which periodically reverses in direction at a rate substantially equal to the gyromagnetic precession rate of said nuclei of known characteristics under such unidirectional magnetization; and detecting a relationship between the precessings of said last-mentioned nuclei and the rate of said periodic reversals in direction to monitor the operativeness of the method with respect to the first-mentioned sample.

11. A method as in claim 10 in which the last-mentioned step comprises ascertaining whether a condition of resonance is effected between the precessings of the nuclei of known characteristics and said rate of periodic reversals.

12. A method for nondestructively analyzing a sample comprising the steps of: equally magnetizing unidirectionally constituent nuclei within both said sample and an additional monitoring sample known to contain nuclei having certain predetermined characteristics; permeating each of the samples with a magnetic field whose orientation is transverse to that of its unidirectional magnetization and which periodically reverses in direction at a rate which is variable over a range including the rate of gyromagnetic precession of nuclei having said known characteristics when they are under such unidirectional magnetization; seeking the presence of a detectable relationship between said periodic reversals and the precessings of said nuclei of known characteristics in the monitoring sample; and varying the rate of said reversals during said seeking until said relationship is observed to exist.

13. A method as in claim 12 in which said detectable relationship is a condition of resonance between said precessings and said rate.

References Cited by the Examiner
UNITED STATES PATENTS 2,455,941 12/1948 Muskat et al.
2,589,494 3/1952 Hershberger _____ 324—0.5 X
2,916,690 12/1959 Leete _____ 324—0.5

OTHER REFERENCES

"Amer. Journal of Physics," vol. 18, No. 7, 1950, pp. 438–452.

"Amer. Journal of Physics," vol. 18, No. 8, November 1950, pp. 473–486.

Anderson: Physical Review, vol. 76, No. 10, Nov. 15, 1949, pp. 1460 through 1470.

"Bell Laboratories Record," vol. XXXI, No. 4, April 1953, pp. 121–126.

(Other references on following page)

Bloembergen et al.: Physical Review, vol. 73, No. 7, April 1, 1948, pp. 679–712.

"Physical Review," vol. 78, No. 5, June 1950, pp. 530–532 and 581–586.

Pound et al.: The Review of Scientific Instruments, vol. 21, No. 3, March 1950, pp. 219–225 incl.

"Recording of Microwave Paramagnetic Resonance Spectra" by Weidner et al., Review of Scientific Instruments, vol. 23, No. 2, February 1952, pp. 75–77.

Volkoff et al.: Canadian Journal of Physics, vol. 30, No. 3, 1952, pp. 270–289 inclusive (pages 277–282 principally relied on).

Zimmerman et al.: Physical Review, vol. 76, No. 3, Aug. 1, 1949, pp. 350 through 357.

WALTER L. CARLSON, *Primary Examiner.*

LEO QUACKENBUSH, NORMAN H. EVANS, CHESTER L. JUSTUS, FREDERICK M. STRADER,
*Examiners.*

J. H. LINSCOTT, J. E. ROSENBLUM, M. R. WILBUR, A. E. RICHMOND, *Assistant Examiners.*